Nov. 15, 1927.  1,649,060
A. G. DECKER
PORTABLE, POWER DRIVEN, ROTARY TOOL WITH SPINDLE
LATCH AND HAND OPERATED CHUCK
Filed Oct. 31, 1925
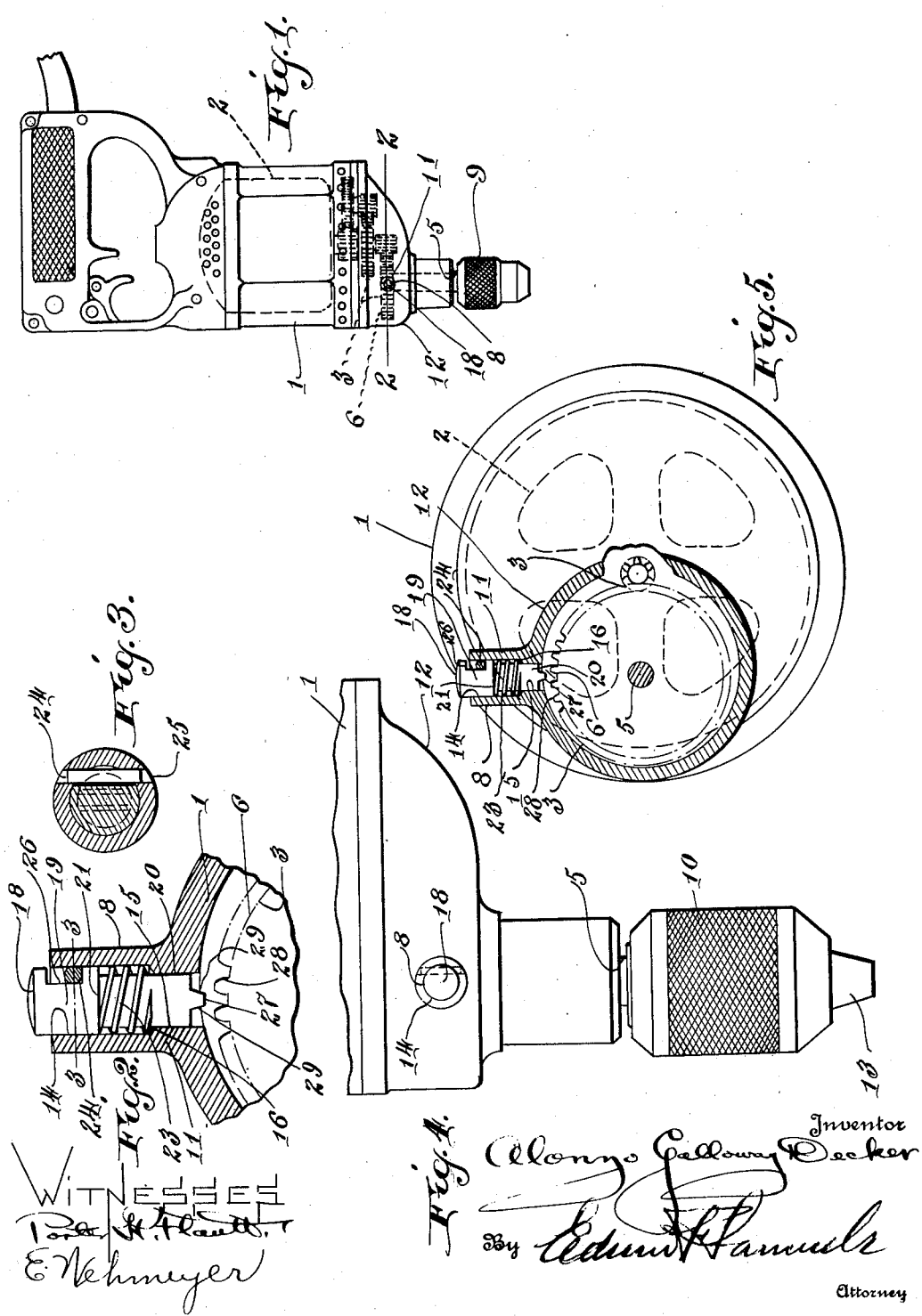

Patented Nov. 15, 1927.

1,649,060

UNITED STATES PATENT OFFICE.

ALONZO GALLOWAY DECKER, OF BALTIMORE COUNTY, MARYLAND, ASSIGNOR TO THE BLACK & DECKER MANUFACTURING COMPANY, OF TOWSON, MARYLAND, A CORPORATION OF MARYLAND.

PORTABLE POWER-DRIVEN ROTARY TOOL WITH SPINDLE LATCH AND HAND-OPERATED CHUCK.

Application filed October 31, 1925. Serial No. 65,966.

Power-driven portable rotary tools are in the majority of instances fitted with a key-actuated chuck on account of the difficulty incident to holding the spindle against rotation, it being understood that such tools are usually driven by electric or compressed air motors which are completely enclosed, so that the spindle and moving parts are not accessible and cannot be held to prevent rotation of the spindle in operating the chuck which is accomplished by turning the chuck collar relatively to the spindle. In accordance with the prevailing practice the chuck collar is provided with a set of bevel gear teeth which mesh with a bevel pinion on the key, which is provided at the end beyond the pinion with a journal pin, which in the operation of the key is seated in one of a series of holes in the spindle or a member rigidly attached to the spindle. The collar is thus turned relatively to the spindle without the necessity for locking the spindle and the chuck is conveniently closed and opened to engage and disengage the various bits.

The main difficulty with the key chuck is that incident to keeping track of the key. The keys cannot be conveniently chained to the tool, as they get caught on various objects and hamper the workmen in handling the tool, and even when so attached, are not convenient for use in operating the chuck. Under existing conditions such rotary, power-driven, portable tools are frequently rendered inoperative on account of the loss of the key.

The object of the present invention is to dispense with the use of the key and provide for the convenient use of a hand operated chuck in this connection.

In accordance with the present invention the rotary parts of the tool which are completely enclosed, are temporarily locked to provide for the operation of the hand chuck. The provision of such a lock in connection with a portable electric or similar tool which is to be used indiscriminately by skilled and unskilled workmen, has the objection, which may be regarded as vital, that the motor is frequently placed in circuit while the shaft is locked, which results in burning of the armature with a considerable expense for repairs.

The present invention relates to the provision in connection with such a portable rotary electric tool or to less advantage with any other rotary portable power-driven tool of a latch or lock for use with a hand-operated chuck, the lock in the preferred form being normally released by means of a spring and only held in engagement by pressure of the thumb or finger of the operator.

The lock or latch is further so designed that the torque of the motor, if the latter be placed in operation, is sufficient to throw the latch out of engagement, even against the heaviest pressure which can be applied to it by the operator, so that burning of the armature on account of inadvertent locking is impossible.

In the accompanying drawing I have illustrated a portable rotary electric tool to which the invention in the preferred form has been applied, and so much of the tool as is necessary to an understanding of the operation and application of the invention.

In the drawings—

Figure 1 is an elevation of a complete tool on a small scale showing a hand-operated chuck and catch in accordance with the invention.

Figure 2 is a fragmentary section on the line 2, 2 of Figure 1 showing all the details of the catch and a fragment of the gear it engages, the figure being on an enlarged scale.

Figure 3 is a section on the line 3, 3 of Figure 2.

Figure 4 is a fragmentary elevation corresponding to Figure 1 and showing on an enlarged scale a chuck and the lower portion of the tool casing spindle, bearing, etc., the chuck being slightly different from that in Figure 1.

Figure 5 is an enlarged section on the line 2, 2 of Figure 1 looking upward.

Referring to the drawings by numerals, each of which is used to indicate the same or similar parts in the different figures, the machine as shown consists of a portable electric drill or other similar portable power-driven rotary tool having a casing 1, motor 2 and gearing 3 connecting the motor 2 to the spindle 5. The last gear of the train is the large gear 6, see Figure 2, secured to the spindle. This is the gear in connection with which the catch or lock 8 has been shown, though it may with almost equal facility be applied to any rotary portion of the tool. The disclosure also includes a hand-operated chuck, chucks 9 and 10 being of slightly different types, Figures 1 and 4.

To provide for the catch the tool casing is cast with a hollow cylindrical bearing boss 11 projecting radially of the spindle from the portion of the casing 1, which will be termed the gear casing 12, the bearing having its axis and direction of motion, for it is a slide bearing, extending radially of the spindle 5 and extending outward from a portion adjacent the periphery of the gear 6.

The bore 14 of this cylindrical projection is reduced at 15 as it approaches the inside of the casing forming an internal peripheral shoulder 16. Sliding in the bore of the projection radially of the spindle is a plunger pin 18 having an enlarged end 19 to fit the enlarged portion of the bore 14, the pin or plunger also having a reduced portion 20 to fit the reduced portion of the bore 15 and a shoulder 21 where the enlarged diameter steps down to the smaller diameter of the pin or plunger. There is a coiled helical spring 23 wound about the reduced portion 20 of the pin or plunger bearing at one end against the shoulder 16 in the bore of the casing and at the other end against the shoulder 21 on the pin, so that the latter is normally withdrawn by the spring.

The plunger is held in the casing by any suitable means shown in the form of transverse pin 24 which is seated in a suitable hole 25 bored in the boss 11 at right angles to the axis of the bore and plunger but not necessarily intersecting the axis. This pin 24 engages a slot 26 in the plunger which is elongated in the direction of the axis of the plunger and bore, and is placed correspondingly to the placing of the pin 24 in a general way at right angles to, as aforesaid, but not necessarily intersecting the axis. The inner end of the plunger 18 is provided with a tooth or inwardly projecting portion 27 adapted to engage between the teeth 28 of the gear 6.

An important feature of the tooth or projecting portion 27 is that it shall have inclined surfaces 29 engaging the corresponding surfaces of the gear or other rotary member which may be locked by the latch or lock, the incline being so designed or chosen in relation to the torque of the motor, that when and if the motor be placed in operation or an attempt be made to so place it, by passing the current through the armature or otherwise applying the actuating agency, the plunger will be forced outwardly by the action of the inclined surfaces 29 or one of them on the gear 6 depending on the direction of rotation. The incline which is outward radially and backward in a direction opposite to the rotation, resolves the torque into two forces, one of which is directed outward radially and serves to release the latch. This force is greater than the opposite force applied to the plunger by the finger of the operator. The motor will be thus released for operation overcoming whatever pressure can be applied by the finger or otherwise manually to the projecting end of the plunger 18.

The operation of the device will be easily understood from the preamble and description. The catch is normally released by means of the spring 23 leaving the motor normally free to rotate and drive the bit in the usual manner. When the chuck is to be opened or closed to release or engage the bit, pressure of the finger or thumb is applied to the plunger 18, overcoming the tendency of the spring and causing the pawl tooth or point 27 of the latch to enter between the teeth 28 of the gear 6.

The spindle 5 is thus locked against rotation, so that the chuck collar 9 or 10 may be rotated by hand, opening or closing the chuck jaws 13, releasing or engaging the bit. The latch is automatically withdrawn by the spring immediately on removal of the pressure applied to the plunger by the operator's finger or thumb, so that the motor is free to rotate at all times except when specifically restrained by pressure upon the latch on the part of the operator.

An important feature of the operation is that the pawl or latch tooth 27 is so designed as to the lateral surfaces 29 engaging the teeth of the gear 28 and inclined at such an angle that the pressure which is conveniently applied to the plunger or pawl by the finger or thumb of the operator, is not sufficient to overcome the tendency to eject or release the latch by the expelling force already described as exerted on the plunger by the torque of the motor through the contact of the teeth 28 of the gear, with the said inclined surfaces 29 of the pawl or latch tooth. This feature of operation has the important function that it prevents burning out of the motor due to inadvertent locking of the spindle which would be an insurmountable obstacle to the use of any means for locking the spindle in a rotary electric tool.

I have thus described specifically and in detail a single embodiment of my invention and the manner of using the same, in order that the nature and operation of the device may be clearly understood; however, the specific terms herein are used descriptively rather than in a limiting sense, the scope of the invention being defined in the claims.

What I claim and desire to secure by Letters Patent is:

1. The combination in a manually portable power-driven rotary tool of a spindle, an electric motor, rotary driving connections from the motor to the spindle, a casing enclosing the motor and connections, a latch engaging one of said rotary members to lock the motor against rotation, and a spring holding the latch normally released, the latch being manually operated to lock the motor, the engaging surfaces being inclined outward radially of the spindle and oppositely to the direction of rotation of the spindle whereby the torque of the motor serves to release the latch.

2. The combination in a manually portable, power-driven rotary tool of a spindle, an electric motor, rotary driving connections from the motor to the spindle, a casing enclosing the motor and connections, a latch engaging one of said rotary members, the engaging surfaces being inclined outward radially of the spindle and oppositely to the direction of rotation of the spindle whereby the torque of the motor serves to release the latch, a spring holding the latch normally retracted, the latch being adapted to be advanced by the pressure of the finger of the operator against the tension of the spring to lock the spindle so that the chuck may be opened and closed.

3. In a manually portable rotary electrically driven tool, the combination of an electric motor, a spindle, connections from the motor to the spindle whereby the latter is driven in rotation, a casing enclosing the motor and drive, a transverse sliding bearing in the casing, a plunger mounted therein having a latch tooth, the rotary parts having a corresponding indentation, a spring engaging the plunger to hold the tooth in retracted position, the plunger also having a portion adapted for manual engagement whereby it may be pressed into engagement with the rotary parts by the finger of the operator, and a hand-operated chuck mounted on the spindle, one of the engaging surfaces which operate to lock the parts against rotation being inclined outwardly in the general direction of the radii of the rotating parts and backward in a direction oppositely to the rotation which is to be checked thereby, so that the torque of the motor if the latter be thrown into circuit when the latch is in engagement, serves to release the latch and prevent burning out of the motor.

Signed by me at Baltimore, Maryland, this 26th day of October, 1925.

ALONZO GALLOWAY DECKER.